(12) United States Patent
Richey, Sr.

(10) Patent No.: US 10,697,749 B1
(45) Date of Patent: Jun. 30, 2020

(54) REED TUBE CANE DIAMETER MEASUREMENT TOOL

(71) Applicant: William L. Richey, Sr., Concord, NC (US)

(72) Inventor: William L. Richey, Sr., Concord, NC (US)

( * ) Notice: Subject to any disclaimer, the term of this patent is extended or adjusted under 35 U.S.C. 154(b) by 0 days.

(21) Appl. No.: 16/593,199

(22) Filed: Oct. 4, 2019

(51) Int. Cl.
*G01B 5/08* (2006.01)
*B23Q 3/06* (2006.01)

(52) U.S. Cl.
CPC .................. *G01B 5/08* (2013.01); *B23Q 3/06* (2013.01)

(58) Field of Classification Search
CPC .... G01B 5/012; G01B 21/047; G01B 11/007; G01B 5/008; G01B 11/005; G01B 2210/58; G01B 3/22; G01B 5/08
USPC .......................................................... 33/501
See application file for complete search history.

(56) References Cited

U.S. PATENT DOCUMENTS

| | | | | |
|---|---|---|---|---|
| 2,886,896 A * | 5/1959 | Humphreville | .... | B23Q 17/2225 33/637 |
| 3,778,906 A * | 12/1973 | Palmenberg | ............ | G01B 5/20 33/555 |
| 4,126,940 A * | 11/1978 | Lendi | ....................... | G01B 3/24 33/501.2 |
| 4,434,557 A * | 3/1984 | Meyer, Jr. | ................ | G01B 3/46 33/501.2 |
| 4,524,524 A * | 6/1985 | Frank | ....................... | G01B 5/12 33/199 R |
| 5,877,405 A * | 3/1999 | Champaigne | ............ | C21D 7/06 33/549 |
| 6,148,532 A * | 11/2000 | Ellis | ....................... | G01B 5/285 33/533 |
| 6,314,655 B1 * | 11/2001 | Quintavalla | ......... | G01B 5/0023 33/549 |
| 2006/0283037 A1 * | 12/2006 | Galle | ....................... | G01B 5/08 33/783 |
| 2015/0192400 A1 * | 7/2015 | Rado | ...................... | G01B 5/043 33/737 |

* cited by examiner

Primary Examiner — Yaritza Guadalupe-McCall

(57) ABSTRACT

The reed tube cane diameter measirement tool may hold a tube cane between a base plate and a centering block and may center the tube cane under the centering block. The reed tube cane diameter measurement tool may support a dial indicator above the cane atop an arch such that the dial indicator plunger may determine the diameter of the tube cane. The tube cane, if selected to have a desired diameter, may be split, shaved, bent, tied, or otherwise processed to create a reed suitable for use with a wind instrument. As a non-limiting example, the wind instrument may be an oboe. A vie wing angle adjuster may improve the visibility of the dial indicator by tilting the reed tube cane diameter measurement tool such that the readout of the dial indicator faces the user.

17 Claims, 7 Drawing Sheets

REED TUBE CANE DIAMETER MEASUREMENT TOOL

STATEMENT REGARDING FEDERALLY SPONSORED RESEARCH

Not Applicable

CROSS REFERENCES TO RELATED APPLICATIONS

Not Applicable

REFERENCE TO APPENDIX

Not Applicable

BACKGROUND OF THE INVENTION

Field of the Invention

The present invention relates to the field of musical instrument accessories, more specifically, a reed tube cane diameter measurement tool.

Many musicians prefer to make their own reeds from tube cane. The reed-making process may begin with the selection of a piece of tube cane of a specific diameter. The diameter that is desired may vary based upon the type of musical instrument, seasonal weather conditions, and the musicians own preferences. As a non-limiting example, the desired diameter of the tube cane for an oboe reed may be between 10.0 mm and 10.5 mm.

SUMMARY OF INVENTION

The reed tube cane diameter measurement tool may hold a tube cane between a base plate and a centering block and may center the tube cane under the centering block. The reed tube cane diameter measurement tool may support a dial indicator above the cane atop an arch such that the dial indicator plunger may determine the diameter of the tube cane. The tube cane, if selected to have a desired diameter, may be split, shaved, bent, tied, or otherwise processed to create a reed suitable for use with a wind instrument. As a non-limiting example, the wind instrument may be an oboe. A viewing angle adjuster may improve the visibility of the dial indicator by tilting the reed tube cane diameter measurement tool such that the readout of the dial indicator faces the user.

An object of the invention is to measure the diameter of a tube cane before using the cane to make a reed for a wind instrument.

Another object of the invention is to provide a centering block to position and retain the tube cane while it is being measured.

A further object of the invention is to provide an arch to elevate a dial indicator above the cane.

Yet another object of the invention is to provide a viewing angle adjuster for improved usability and dial indicator visibility.

These together with additional objects, features and advantages of the reed tube cane diameter measurement tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the reed tube cane diameter measurement tool in detail, it is to be understood that the reed tube cane diameter measurement tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the reed tube cane diameter measurement tool.

It is therefore important that the claims be regarded as including such equivalent construction insofar as they do not depart from the spirit and scope of the reed tube cane diameter measurement tool. It is also to be understood that the phraseology and terminology employed herein are for purposes of description and should not be regarded as limiting.

BRIEF DESCRIPTION OF DRAWINGS

The accompanying drawings, are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations, All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
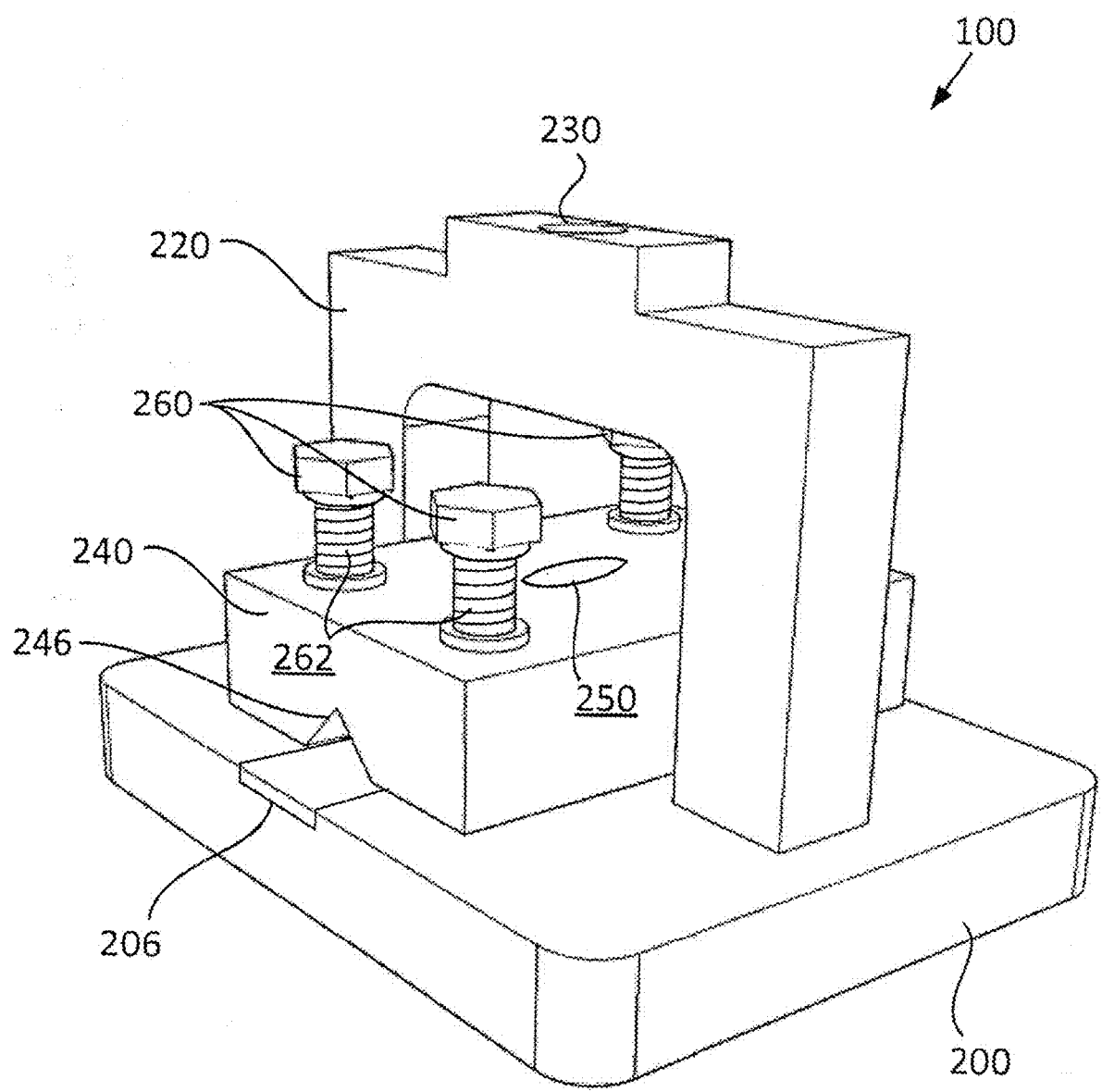
FIG. 1 is a perspective view of an embodiment of the disclosure.
Figure 2:
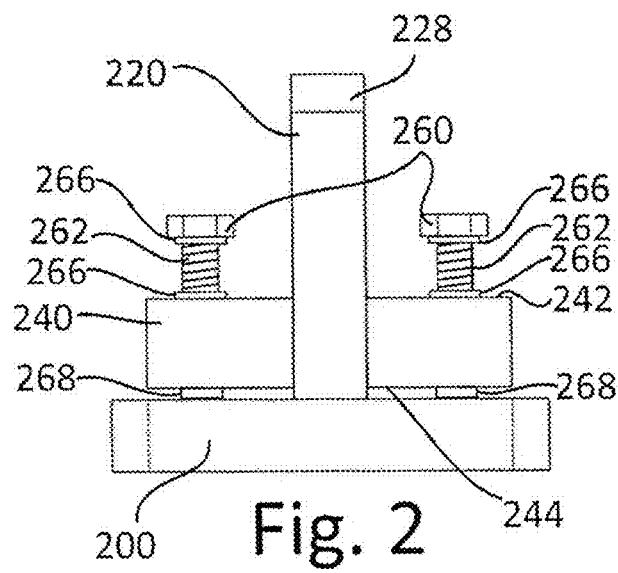
FIG. 2 is a front view of an embodiment of the disclosure.
Figure 3:
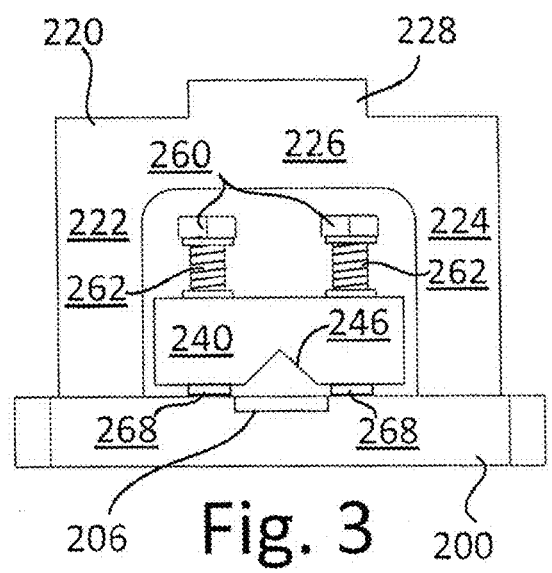
FIG. 3 is a side view of an embodiment of the disclosure.
Figure 4:
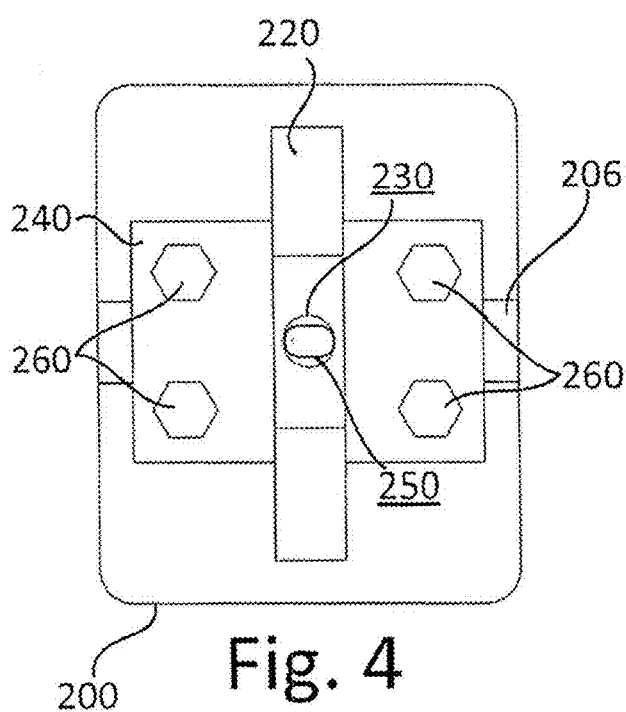
FIG. 4 is a top view of an embodiment of the disclosure.
Figure 5:
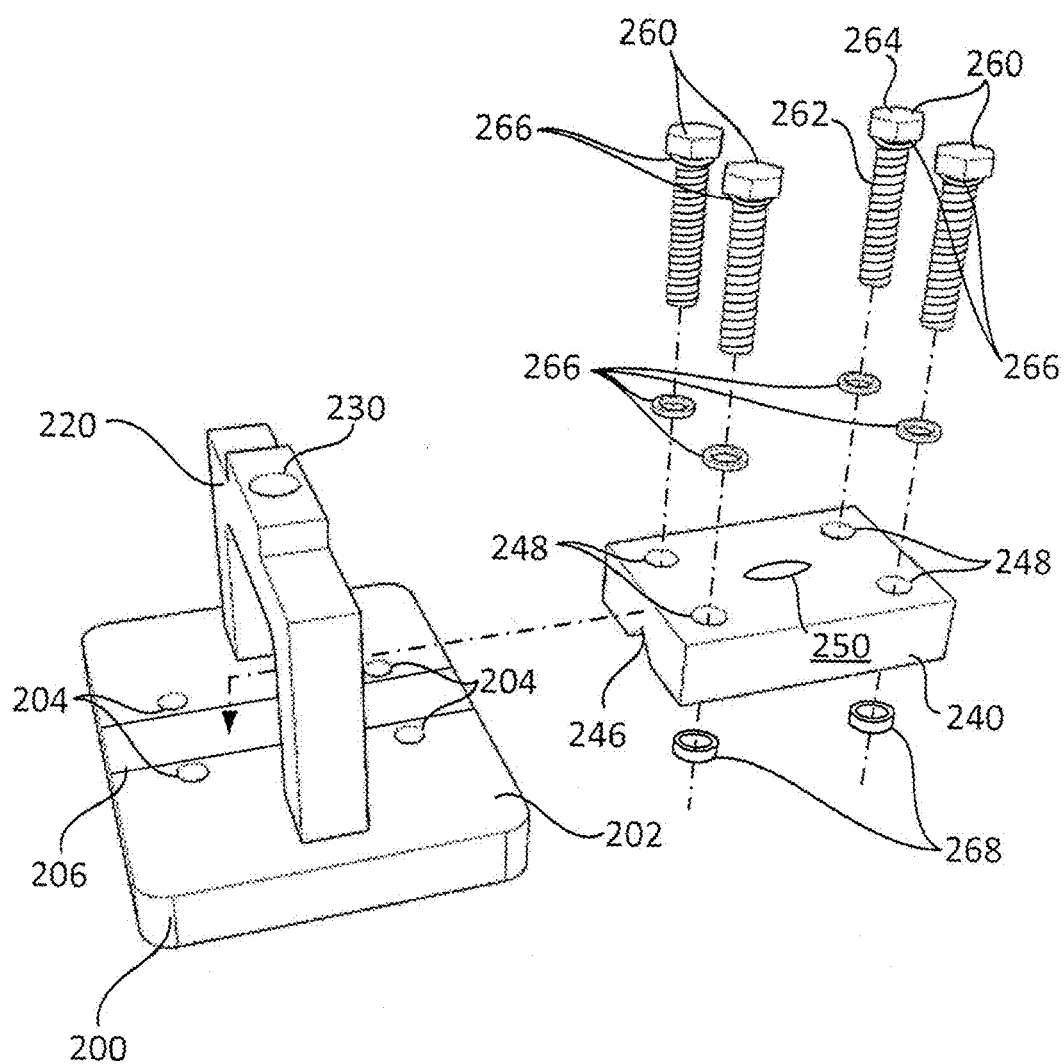
FIG. 5 is an exploded view of an embodiment of the disclosure.
Figure 6:
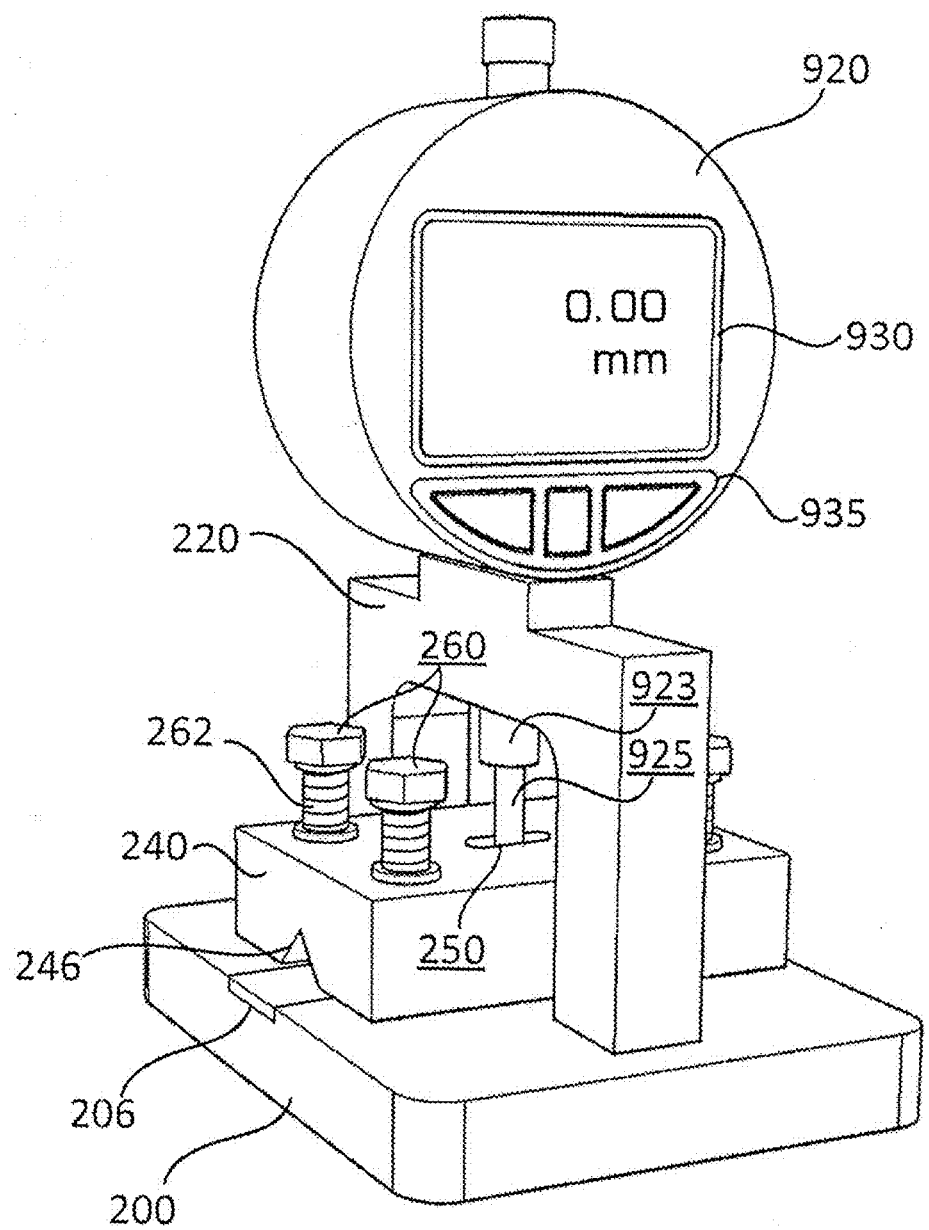
FIG. 6 is a detail view of an embodiment of the disclosure illustrating the dial indicator in position atop the arch.
Figure 7:
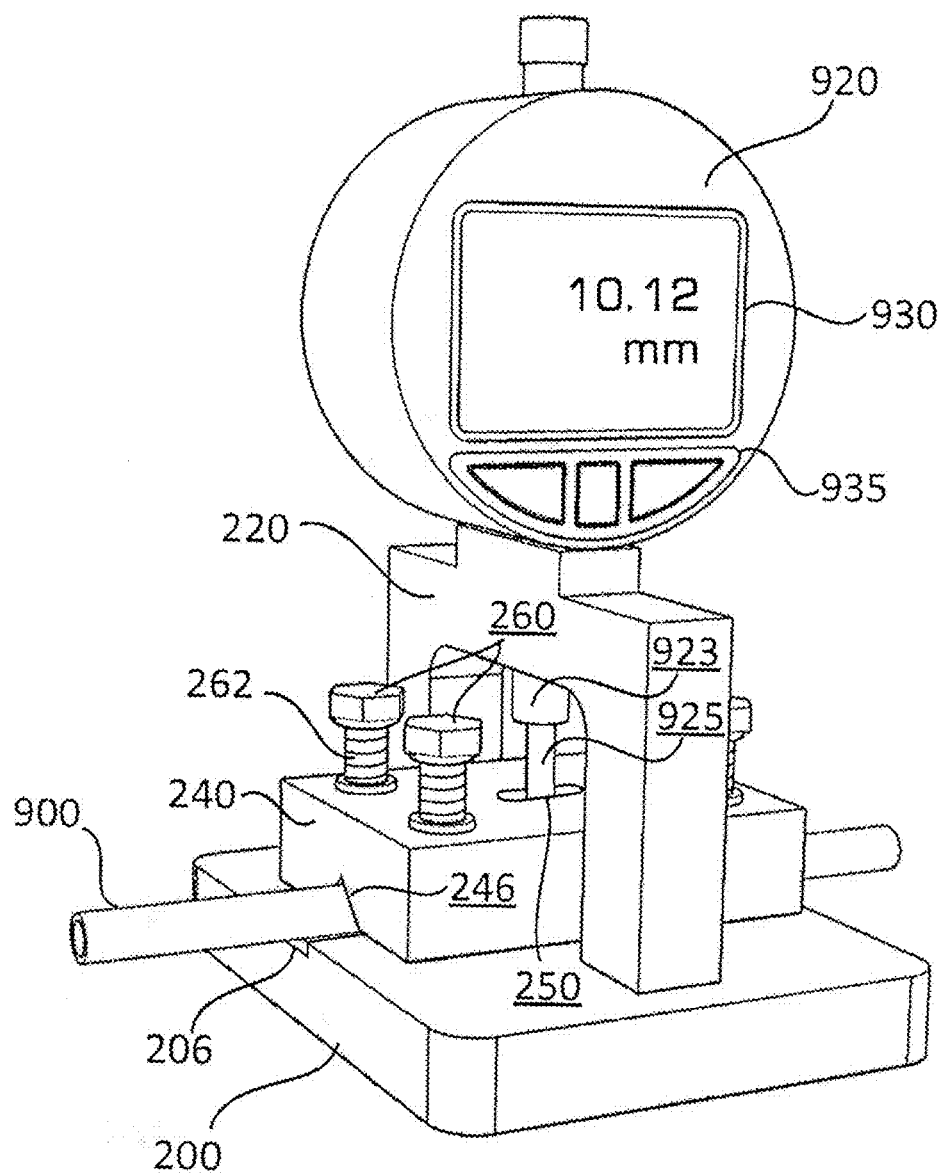
FIG. 7 is an in-use view of an embodiment of the disclosure illustrating the measurement of the diameter of a tube cane.
Figure 8:
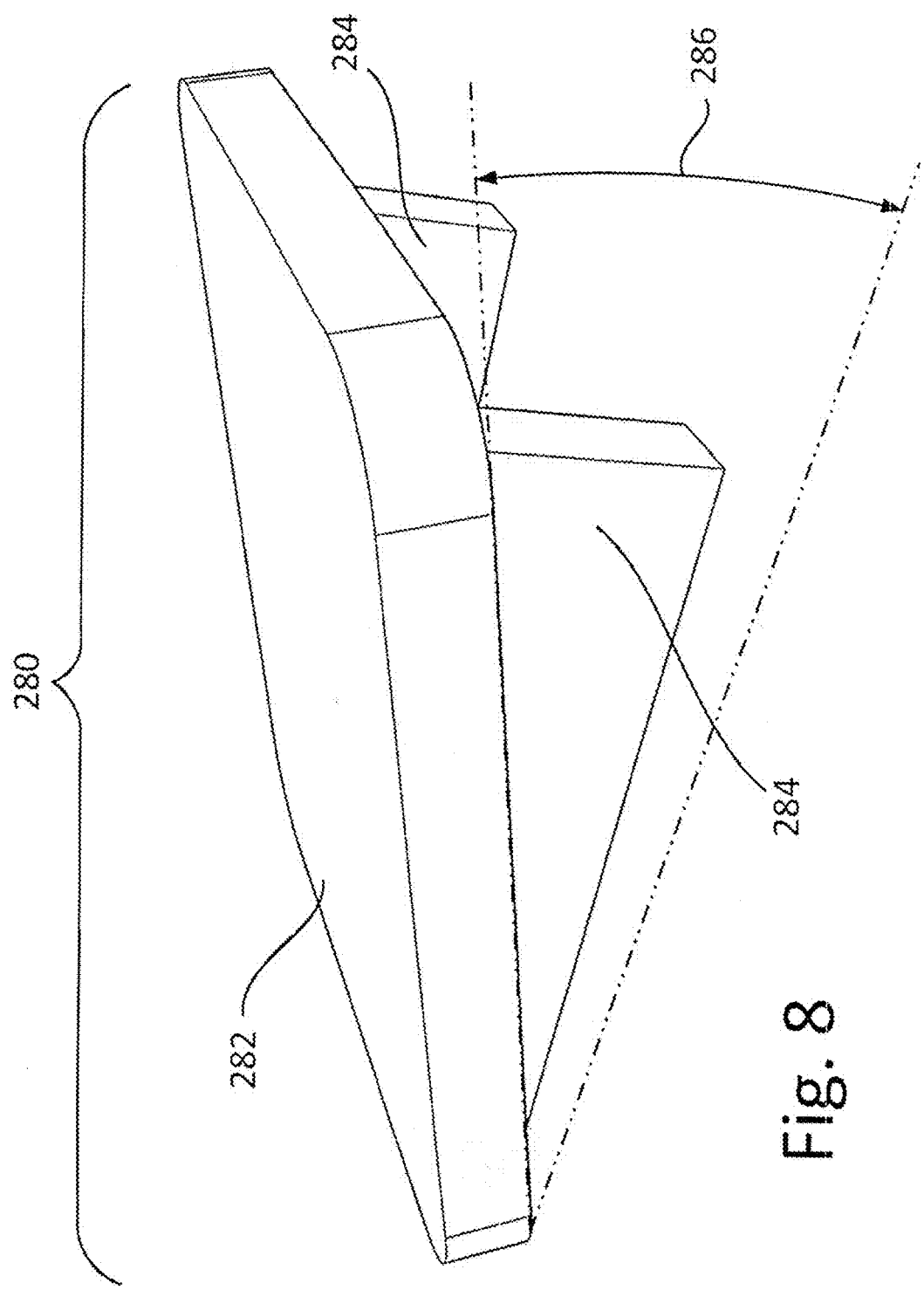
FIG. 8 is a perspective view of an embodimen of the disclosure illustrating the viewing angle adjuster.
Figure 9:
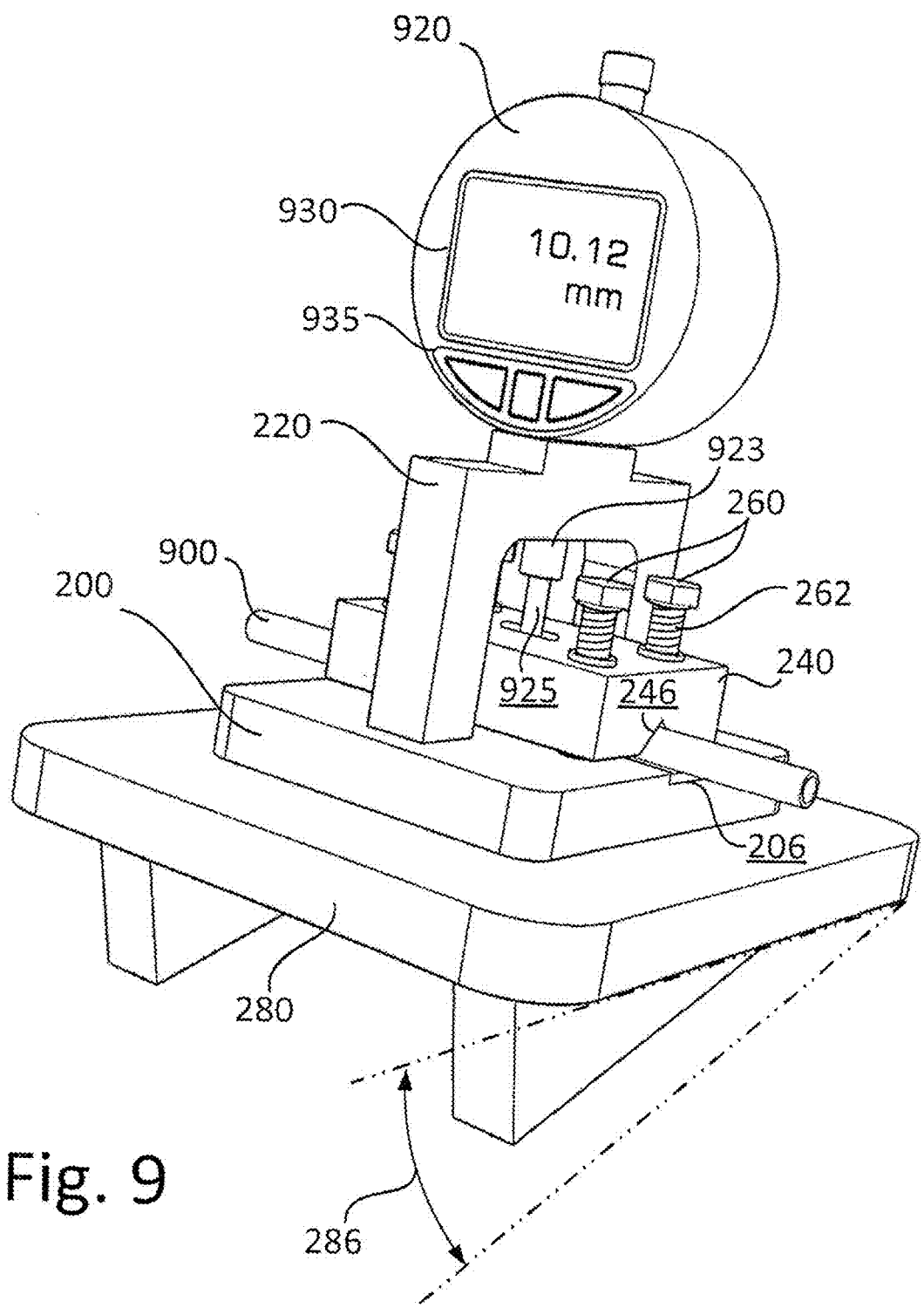
FIG. 9 is an in-use view of an embodiment of the disclosure illustrating the measurement of the diameter of a tube cane with the viewing angle tilted.

Detailed reference will now be made to a first potential embodiment of the disclosure, which is illustrated in FIGS. 1 through 9.

The reed tube cane diameter measurement tool 100 (hereinafter invention) comprises a base plate 200, an arch 220, a centering block 240, and a plurality of alignment posts 260. The invention 100 may hold a tube cane 900 between the base plate 200 and the centering block 240 and may center the tube cane 900. The invention 100 may support a dial indicator 920 above the tube cane 900 atop the arch 220 such that the dial indicator 920 may determine the diameter of the tube cane 900. The tube cane 900, if selected to have a desired diameter, may be split, shaved, bent, tied, or otherwise processed to create a reed suitable for use with a wind instrument. As a non-limiting example, the wind instrument may be an oboe.

The base plate 200 may be a horizontally-oriented bottom support layer for the invention 100 which may rest upon a work surface during use. The base plate 200 may be the shape of rectangular prism. Not related to the function of the invention 100, one or more corners of the base plate 200 or other parts of the invention 100 may be rounded for aesthetics or safety reasons. The plurality of alignment posts 260 may couple to a plurality of alignment post mounting apertures 204 which are accessible on a base plate top surface 202. In some embodiments, the base plate 200 may be made from first material and may comprise an inset 206 which is a section of the base plate 200 on the top of the base plate 200 that is made from second material. The second material may be harder than the first material. The inset 206 may run parallel to a centering notch 246 in the centering block 240 such that the tube cane 900 is held between the inset 206 and the centering notch 246.

The arch 220 may comprise a rear leg 222, a front leg 224, and a center beam 226. The arch 220 may elevate the dial indicator 920 above the base plate 200. The bottom of the rear leg 222 and the bottom of the front leg 224 may couple to the base plate top surface 202. The top of the front leg 224 may be coupled to front of the center beam 226 and the top of the rear leg 222 may be coupled to the rear of the center beam 226. An arch aperture 230 may pass through the center of the center beam 226 from top to bottom. The diameter of the arch aperture 230 may be larger than the maximum diameter of a mounting stem 923 on the dial indicator 920. The dial indicator 920 may rest on the top of the arch 220 with a plunger 925 of the dial indicator 920 passing through the arch aperture 230 into the open space beneath the arch 220. The front leg 224 and the rear leg 222 may elevate the top of the arch 220 to a height that is less than the length of the plunger 925 on the dial indicator 920 such that the plunger 925 touches the base plate 200 when the dial indicator 920 is place on top of the arch 220. In some embodiments, the arch 220 may comprise an instrument spacer 228 which may be a vertical thickening of the center beam 226 to assure the correct elevation of the dial indicator 920 while conserving materials.

The centering block 240 may be located between the base plate 200 and the arch 220 where the centering block 240 may retain the tube cane 900 in a position that is centered under the dial indicator 920. The centering block 240 may be the shape of a rectangular prism. The centering block 240 may have a centering block top surface 242 and a centering block bottom surface 244. The centering block 240 may comprise the centering notch 246 that runs laterally across the center of the centering block bottom surface 244.

The centering block 240 may comprise a central aperture 250 which is vertically-oriented and which the plunger 925 may pass through. The diameter of the central aperture 250 may be larger than the diameter of the plunger 925.

The plurality of alignment posts 260 may be vertically-oriented shafts that guide the up and down motion of the centering block 240. The plurality of alignment posts 260 may be positioned to match the layout of the plurality of alignment post mounting apertures 204 in the base plate 200. The plurality of alignment posts 260 may pass through a plurality of alignment apertures 248 in the centering block 240 and then couple with the base plate 200 at the plurality of alignment post mounting apertures 204. The diameter of the plurality of alignment apertures 248 may be larger than the diameter of the plurality of alignment posts 260.

Each of the plurality of alignment posts 260 may comprise a head 264 to limit the height that the centering block 240 may be lifted and to retain a spring 262. The spring 262 may surround each of the plurality of alignment posts 260 above the entering block 240 to push down on the centering block 240 such that pressure is applied to hold the tube cane 900 between the base plate 200 and the centering block 240. A plurality of washers 266 may be located above and below the springs 262 on all of the plurality of alignment posts 260. The springs 262 may push the plurality of washers 266 against the heads 264 of the, plurality of alignment posts 260 on top and the centering block top surface 242 on the bottom.

The plunger 925 of the dial indicator 920 may be placed into the arch aperture 230 and may pass through the arch 220 and through the central aperture 250 of the centering block 240 until the dial indicator 920 contacts the top of the arch 220. The bottom of the plunger 925 may contact the base plate 200. The dial indicator 920 may be zeroed, using one or more operator controls 935 on the dial indicator 920, The centering block 240 and the dial indicator 920 may be lifted and the tube cane 900 may be placed between the base plate 200 and the centering block 240. The centering block 240 and the dial indicator 920 may be lowered. The diameter of the tube cane 900 may be read from a readout 930 of the dial indicator 920, A plurality of spacers 268 may surround the plurality of alignment posts 260 between the base plate 200 and the centering block 240 to prevent the base plate 200 and the centering block 240 from touching.

The invention 100 may further comprise a viewing angle adjuster 280. The viewing angle adjuster 280 may improve the visibility of the dial indicator 920. The base plate 200 may be placed upon the viewing angle adjuster 280 with the readout 930 of the dial indicator 920 on the higher side of the viewing angle adjuster 280 such that the viewing angle adjuster 280 tilts the base plate 200 to a viewing angle 286. In some embodiments, the viewing angle 286 may be between 5 degrees and 40 degrees. In a preferred embodiment, the viewing angle 286 may be 15 degrees +/−5 degrees.

The viewing angle adjuster 280 may comprise an angle adjuster platform 282 and one or more angle adjuster wedges 284. The angle adjuster platform 282 may be the shape of a rectangular prism and may provide a work surface for the base plate 200 to rest upon. The angle adjuster platform 282 may be larger than the base plate 200 such that the base plate 200 does not extend beyond the edges of the angle adjuster platform 282 when the base plate 200 is placed upon the angle adjuster platform 282. The one or more angle adjuster wedges 284 may be one or more angled supports coupled to the underside of the angle adjuster platform 282 to tilt the angle adjuster platform 282 to the viewing angle 286.

In use, the invention 100 may be placed on a working surface and the plunger 925 of the dial indicator 920 may be inserted into the arch aperture 230 such that the plunger 925 passes through the arch 220, through the centering block 240, and touches the base plate 200. The dial indicator 920 may rest upon the top of the arch 220. The dial indicator 920 may be zeroed using the one or more operator controls 935. The dial indicator 920 and the centering block 240 may be raised so that the tube cane 900 may slide into the invention 100 between the base plate 200 and the centering block 240. The centering block 240 may be lowered onto the tube cane 900 with the centering notch 246 forcing the tube cane 900 to remain centered. The dial indicator 920 may be lowered such that the dial indicator 920 rests upon the top of the arch 220. The diameter of the tube cane 900 may be read from the dial indicator 920.

While the tube cane 900 is in the invention 100, the tube cane 900 may be rotated until the dial indicator 920 shows the smallest diameter. This may help to identify a desirable flat spot on the tube cane 900.

For easier viewing of the readout 930, the invention 100 may be placed upon the viewing angle adjuster 280 such that the viewing angle adjuster 280 is inclined up towards the user and the readout 930 of the dial indicator 920 faces the user.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used herein, "dial indicator" refers to an instrument that indicates, on a dial or digital readout, the distance between a plunger tip and a zero setting. The instrument may accurately show small changes in distance that the naked eye may not discern. A dial indicator may also be referred to as a drop indicator, a digital dial indicator, a dial gauge, a probe indicator, a test indicator, a dial test indicator, or a plunger indicator.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations there whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used herein, the word "desired" refers to a specific value or action within a range of supported values or action. A "desired" value or action indicates that a range of values or actions is enabled by the invention and that a user of the invention may select a specific value or action within the supported range of values or action based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, "elevation" refers to the span of the distance between a horizontal surface and a support surface as measured in the direction opposite to the force of gravity.

As used herein, "front" indicates the side of an object that is closest to a forward direction of travel under normal use of the object of the side or part of an object that normally presents itself to view or that is normally used first. "Rear" or "back" refers to the side that is opposite the front.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the word "lateral" refers to the sides of an object or movement towards a slide. Lateral directions are generally perpendicular to longitudinal directions. "Laterally" refers to movement in a lateral direction.

As used in this disclosure, a "notch" is an indentation formed in an edge or a cavity or aperture formed within a surface.

As used in this disclosure, a "prism" is a 3 dimensional geometric structure wherein the form factor of two faces of the prism are congruent and the two congruent faces are parallel to each other. The two congruent faces are also commonly referred to as the ends of the prism. The surfaces that connect the two congruent faces are called that lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a Prism is defined as a line that joins the center point of the first congruent face of the prism to the center point of the second corresponding congruent face of the prism. The center axis of a prism is otherwise analogous the center axis of a cylinder. A. prism wherein the ends are circles is commonly referred to as a cylinder.

As used in this disclosure, the term "rounded" refers to the replacement of an apex, vertex, or edge or brink of a structure with a (generally smooth) curvature wherein the concave portion of the curvature faces the interior or center of the structure.

As used in this disclosure, a "tool" is a device, an apparatus, or an instrument that is used to carry out an activity, operation, or procedure.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 9, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A reed tube cane diameter measurement tool comprising:
   a base plate, an arch, a centering block, and a plurality of alignment posts;
   wherein the reed tube cane diameter measurement tool holds a tube cane between the base plate and the centering block and centers the tube cane;
   wherein the reed tube cane diameter measurement tool supports a dial indicator above the tube cane such that the dial indicator determines the diameter of the tube cane;
   wherein the base plate is a horizontally-oriented bottom support layer for the reed tube cane diameter measurement tool which rests upon a work surface during use;
   wherein the base plate is the shape of a rectangular prism;
   wherein the plurality of alignment posts couple to a plurality of alignment post mounting apertures which are accessible on a base plate to surface;
   wherein the base plate is made from first material and comprises an inset which is a section of the base plate on the top of the base plate that is made from second material;
   wherein the second material is harder than the first material;
   wherein the inset runs parallel to a centering notch in the centering block such that the tube cane is held between the inset and the centering notch.

2. The reed tube cane diameter measurement tool according to claim 1
   wherein the arch comprises a rear leg, a front leg, and a center beam;
   wherein the arch elevates the dial indicator above the base plate;
   wherein the bottom of the rear leg and the bottom of the front leg couple to the base plate top surface;
   wherein the top of the front leg is coupled to front of the center beam and the top of the rear leg is coupled to the rear of the center beam.

3. The reed tube cane diameter measurement tool according to claim 2
   wherein an arch aperture passes through the center of the center beam from top to bottom;
   wherein the diameter of the arch aperture is larger than the maximum diameter of a mounting stem on the dial indicator.

4. The reed tube cane diameter measurement tool according to claim 3
   wherein the dial indicator rests on the top of the arch with a plunger of the dial indicator passing through the arch aperture into the open space beneath the arch;
   wherein the front leg and the rear leg elevate the top of the arch to a height that is less than the length of the plunger on the dial indicator such that the plunger touches the base plate when the dial indicator is placed on top of the arch.

5. The reed tube cane diameter measurement tool according to claim 4
   wherein the arch comprises an instrument spacer which is a vertical thickening of the center beam to assure the correct elevation of the dial indicator while conserving materials.

6. The reed tube cane diameter measurement tool according to claim 4
   wherein the centering block is located between the base plate and the arch;
   wherein the centering block retains the tube cane in a position that is centered under the dial indicator;
   wherein the centering block is the shape of a rectangular prism;
   wherein the centering block has a centering block top surface and a centering block bottom surface.

7. The reed tube cane diameter measurement tool according to claim 6
   wherein the centering block comprises the centering notch that runs laterally across the center of the centering block bottom surface.

8. The reed tube cane diameter measurement tool according to claim 7
   wherein the centering block comprises a central aperture which is vertically-oriented and which the plunger passes through;
   wherein the diameter of the central aperture is larger than the diameter of the plunger.

9. The reed tube cane diameter measurement tool according to claim 8
   wherein the plurality of alignment posts are vertically-oriented shafts that guide the up and down motion of the centering block;
   wherein the plurality of alignment posts are positioned to match the layout of the plurality of alignment post mounting apertures in the base plate;
   wherein the plurality of alignment posts pass through a plurality of alignment apertures in the centering block and then couple with the base plate at the plurality of alignment post mounting apertures.

10. The reed tube cane diameter measurement tool according to claim 9
    wherein the diameter of each of the plurality of alignment apertures are larger than the diameter of the plurality of alignment posts.

11. The reed tube cane diameter measurement tool according to claim 10
    wherein each of the plurality of alignment posts comprise a head to limit the height that the centering block is lifted and to retain a spring;
    wherein the spring surrounds each of the plurality of alignment posts above the centering block to push down on the centering block such that pressure is applied to hold the tube cane between the base plate and the centering block;
    wherein a plurality of washers are located above and below the springs on the plurality of alignment posts;
    wherein the springs push the plurality of washers against the heads of the plurality of alignment posts on top and the centering block top surface on the bottom.

12. The reed tube cane diameter measurement tool according to claim 11
    wherein the plunger of the dial indicator is placed into the arch aperture and passes through he arch and through the central aperture of the centering block until the dial indicator contacts the top of the arch;

wherein the bottom of the plunger contacts the base plate;

wherein the dial indicator is zeroed using one or more operator controls on the dial indicator;

wherein the centering block and the dial indicator are lifted and the tube cane is placed between the base plate and the centering block;

wherein the centering block and the dial indicator are lowered;

wherein the diameter of the tube cane is read from a readout of the dial indicator.

13. The reed tube cane diameter measurement tool according to claim 12 wherein a plurality of spacers surrounds the plurality of alignment posts between the base plate and the centering block to prevent the base plate and the centering block from touching.

14. The reed tube cane diameter measurement tool according to claim 13 further comprising:

a viewing angle adjuster;

wherein the viewing angle adjuster improves the visibility of the dial indicator;

wherein the base plate is placed upon the viewing angle adjuster with the readout of the dial indicator on the higher side of the viewing angle adjuster such that the viewing angle adjuster tilts the base plate to a viewing angle.

15. The reed tube cane diameter measurement tool according to claim 14 wherein the viewing angle is between 5 degrees and 40 degrees.

16. The reed tube cane diameter measurement tool according to claim 15 wherein the viewing angle is 15 degrees +/−5 degrees.

17. The reed tube cane diameter measurement tool according to claim 14 wherein the viewing angle adjuster comprises an angle adjuster platform and one or more angle adjuster wedges;

wherein the angle adjuster platform is the shape of a rectangular prism and provides a work surface for the base plate to rest upon;

wherein the angle adjuster platform is larger than the base plate such that the base plate does not extend beyond the edges of the angle adjuster platform when the base plate is placed upon the angle adjuster platform;

wherein the one or more angle adjuster wedges are one or more angled supports coupled to the underside of the angle adjuster platform to tilt the angle adjuster platform to the viewing angle.

\* \* \* \* \*